(12) United States Patent
Sekine et al.

(10) Patent No.: US 9,595,731 B2
(45) Date of Patent: Mar. 14, 2017

(54) ELECTROLYTE FOR REDOX FLOW BATTERY AND REDOX FLOW BATTERY

(71) Applicant: Sumitomo Electric Industries, Ltd., Osaka-shi (JP)

(72) Inventors: Ryojun Sekine, Osaka (JP); Yongrong Dong, Osaka (JP); Michiru Kubata, Osaka (JP); Hirokazu Kaku, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 14/422,792

(22) PCT Filed: Aug. 7, 2013

(86) PCT No.: PCT/JP2013/071426
§ 371 (c)(1),
(2) Date: Feb. 20, 2015

(87) PCT Pub. No.: WO2014/203409
PCT Pub. Date: Dec. 24, 2014

(65) Prior Publication Data
US 2015/0221969 A1    Aug. 6, 2015

(30) Foreign Application Priority Data

Jun. 21, 2013  (JP) .................... 2013-131100

(51) Int. Cl.
*H01M 8/18*  (2006.01)
*H01M 8/20*  (2006.01)

(52) U.S. Cl.
CPC ......... *H01M 8/188* (2013.01); *H01M 8/20* (2013.01); *H01M 2220/10* (2013.01);
(Continued)

(58) Field of Classification Search
None
See application file for complete search history.

(56) References Cited

U.S. PATENT DOCUMENTS 4,874,483 A    10/1989  Wakabayashi et al.
5,587,132 A *  12/1996  Nakajima ............ C01G 31/00
                                                           252/500
(Continued)

FOREIGN PATENT DOCUMENTS

CN    1515045 A    7/2004
EP    0713257 A1   5/1996
(Continued)

OTHER PUBLICATIONS

International Preliminary Report on Patentability in PCT International Application No. PCT/JP2013/071426, dated May 1, 2014.
(Continued)

*Primary Examiner* — Ula C Ruddock
*Assistant Examiner* — Matthew Van Oudenaren
(74) *Attorney, Agent, or Firm* — Venable LLP; Michael A. Sartori; David M. Klecyngier

(57) ABSTRACT

Provided is an electrolyte for a redox flow battery, the electrolyte allowing suppression of generation of precipitate during a battery reaction. In the electrolyte for a redox flow battery, the total concentration of impurity element ions contributing to generation of precipitate during a battery reaction is 220 mass ppm or less. In a case where the impurity element ions contributing to generation of precipitate include metal element ions, the total concentration of the metal element ions may be 195 mass ppm or less. In a case where the impurity element ions contributing to generation of precipitate include non-metal element ions, the total concentration of the non-metal element ions may be 21 mass ppm or less.

7 Claims, 1 Drawing Sheet

(52) U.S. Cl.
CPC ........ *H01M 2250/10* (2013.01); *H01M 2300/0002* (2013.01); *Y02B 90/14* (2013.01); *Y02E 60/528* (2013.01)

(56) References Cited

U.S. PATENT DOCUMENTS

| | | | |
|---|---|---|---|
| 7,258,947 | B2 | 8/2007 | Kubata et al. |
| 2004/0191623 | A1* | 9/2004 | Kubata .......... H01M 8/188 429/189 |
| 2010/0143781 | A1* | 6/2010 | Keshavarz ........ H01M 8/20 429/107 |
| 2013/0157162 | A1 | 6/2013 | Dong et al. |

FOREIGN PATENT DOCUMENTS

| | | |
|---|---|---|
| EP | 1406333 A1 | 4/2004 |
| JP | 60-115174 | 6/1985 |
| JP | 01-294368 | 11/1989 |
| JP | 03-192662 B2 | 8/1991 |
| JP | 06-260204 | 9/1994 |
| JP | 08-078042 | 3/1996 |
| JP | 08-148177 | 6/1996 |
| JP | 2002-367657 A | 12/2002 |
| JP | 3897544 B2 | 3/2007 |
| JP | 2011-233372 A | 11/2011 |
| JP | 2012-079678 A | 4/2012 |
| KR | 10-2013-0038234 A | 4/2013 |
| TW | 201327993 A1 | 7/2013 |
| WO | WO-2004/099079 A1 | 11/2004 |
| WO | WO-2010/138945 A2 | 12/2010 |
| WO | WO-2010/138945 A3 | 4/2011 |
| WO | WO-2012/132091 A1 | 10/2012 |
| WO | WO-2013/054921 A1 | 4/2013 |

OTHER PUBLICATIONS

International Search Report in PCT International Application No. PCT/JP2013/071426 dated Nov. 12, 2013.

Notification of the Office Action issued in Taiwanese Patent Application No. 103127093, dated Mar. 23, 2015.
Notification of the Office Action issued in Taiwanese Patent Application No. 103127098, dated Mar. 23, 2015.
Notification of the Office Action issued in Taiwanese Patent Application No. 103127100, dated Mar. 23, 2015.
International Preliminary Report on Patentability in International Application No. PCT/JP2013/071427, dated May 1, 2014.
International Search Report in International Application No. PCT/JP2013/071427 dated Nov. 12, 2013.
International Preliminary Report on Patentability in International Application No. PCT/JP2013/071425, dated May 1, 2014.
International Search Report in International Application No. PCT/JP2013/071425 dated Nov. 12, 2013.
Notice of Decision for Patent in Korean Patent Application No. 10-2015-7004129, dated Apr. 6, 2015.
Office Action in U.S. Appl. No. 14/422,797, dated Oct. 21, 2015.
Chuan, et al., "Solubility of heavy metals in a contaminated soil: Effects of redox potential and pH" (Abstract) Water, Air, and Soil Pollution, Aug. 1996, vol. 90, Issue 3-4, pp. 543-556.
Azaroual, et al., "Solubility of platinum in aqueous solutions at 25C and pHs 4 to 10 under oxidizing conditions," Geochimica et Cosmochimica Acta, Elsevier, 2001, 65, pp. 4453-4466.
Office Action in U.S. Appl. No. 14/422,792, dated Sep. 15, 2015.
Supplementary European Search Report in European Patent Application No. 13887535.6, dated Jul. 2, 2015.
Communication pursuant to Article 94(3) EPC in European Patent Application No. 13887535.6, dated Jul. 24, 2015.
Supplementary European Search Report in European Patent Application No. 13887572.9, dated Jul. 2, 2015.
Supplementary European Search Report in European Patent Application No. 13887472.2, dated Jul. 2, 2015.
Communication pursuant to Article 94(3) EPC in European Patent Application No. 13887472.2, dated Jul. 28, 2015.
Office Action in U.S. Appl. No. 14/422,785, dated Aug. 27, 2015.

\* cited by examiner

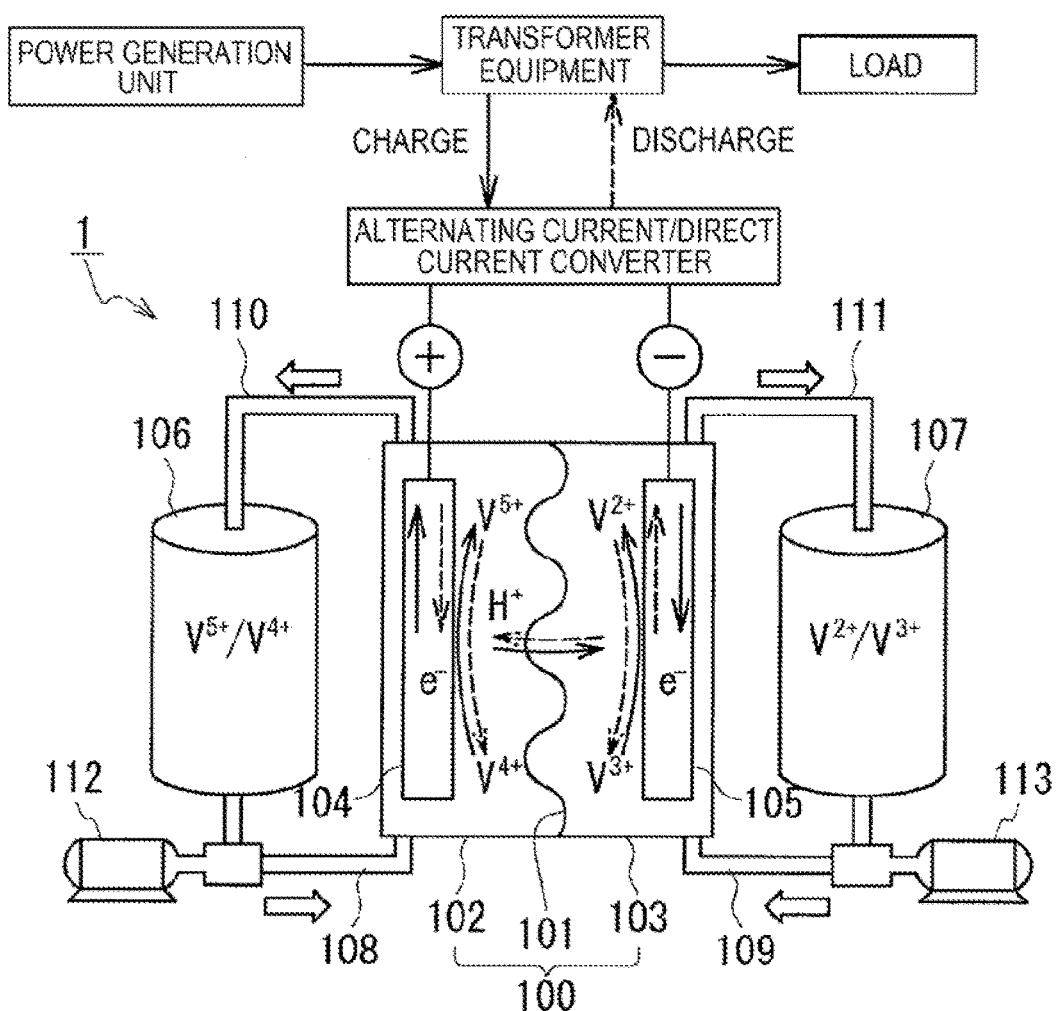

ELECTROLYTE FOR REDOX FLOW BATTERY AND REDOX FLOW BATTERY

TECHNICAL FIELD

The present invention relates to an electrolyte for a redox flow battery and a redox flow battery including the electrolyte for a redox flow battery.

BACKGROUND ART

Recently, in order to address global warming, power generation by using natural energy (what is called renewable energy) such as solar photovoltaic power generation and wind power generation has been actively performed throughout the world. Output of this power generation is significantly affected by natural conditions such as the weather. Accordingly, it is predicted that an increase in the ratio of power derived from natural energy to the total output of power generation will cause problems during operation of power systems such as difficulty in maintaining frequencies and voltages. In order to address such problems, large-capacity storage batteries may be installed to achieve, for example, smoothing of output variations and load leveling.

Among large-capacity storage batteries, there is a redox flow battery. The redox flow battery is a secondary battery that includes a battery cell having a positive electrode, a negative electrode, and a membrane interposed therebetween and is configured to be charged and discharged while a positive electrode electrolyte and a negative electrode electrolyte are supplied to the battery cell. In general, such redox-flow-battery electrolytes used for redox flow batteries employ, as an active material, a metal element that undergoes a change in valence by oxidation-reduction. For example, there are an iron ($Fe^{2+}/Fe^{3+}$)-chromium ($Cr^{3+}/Cr^{2+}$)-based redox flow battery employing iron (Fe) ions as a positive electrode active material and chromium (Cr) ions as a negative electrode active material; and a vanadium ($V^{2+}/V^{3+}$-$V^{4+}/V^{5+}$)-based redox flow battery employing vanadium (V) ions as active materials for the two electrodes.

CITATION LIST

Patent Literature

PTL 1: Japanese Patent No. 3897544

SUMMARY OF INVENTION

Technical Problem

In redox flow batteries, as battery reactions (charge and discharge operations) are repeated, precipitate derived from active material (hereafter simply referred to as precipitate) is gradually generated. For example, in a vanadium-based redox flow battery, precipitate such as an oxide of vanadium is generated. When such precipitate adheres to the surface of an electrode in the cell to cover reaction active sites on the electrode, the surface area of the electrode is substantially decreased, so that the performance of the battery is degraded, such as a decrease in the output of the battery and a decrease in the capacity of the battery. PTL 1 describes, as impurities that contribute to generation of precipitate in electrolytes, ammonium ($NH_4$) and silicon (Si). PTL 1 discloses that, by specifying the concentration of $NH_4$ and by determining the concentration of Si in relation to the amount of electrolytes and the area of electrodes, generation of precipitate can be suppressed.

However, even in the case of using such electrolytes for a redox flow battery in PTL 1, in some cases, precipitate is generated and the performance of the battery is degraded. In short, there is a possibility that the factors that cause generation of precipitate are not completely identified.

Accordingly, an object of the present invention is to provide an electrolyte for a redox flow battery, the electrolyte allowing suppression of generation of precipitate. Another object of the present invention is to provide a redox flow battery including this electrolyte for a redox flow battery.

Solution to Problem

The present application provides an electrolyte for a redox flow battery, wherein a total concentration of impurity element ions contributing to generation of precipitate during a battery reaction is 220 mass ppm or less.

Advantageous Effects of Invention

This electrolyte for a redox flow battery allows suppression of generation of precipitate in a redox flow battery.

BRIEF DESCRIPTION OF DRAWING

FIG. 1 illustrates the principle of operation of a redox flow battery.

DESCRIPTION OF EMBODIMENTS

[Description of Embodiments According to the Invention of the Present Application]

Features of embodiments according to the invention of the present application will be first described in sequence.
(A) An embodiment provides an electrolyte for a redox flow battery (hereafter referred to as an RF electrolyte), wherein a total concentration of impurity element ions contributing to generation of precipitate during a battery reaction is 220 mass ppm or less.

The inventors of the present invention have found that generation of precipitate and generation of hydrogen during a battery reaction of a redox flow battery (hereafter referred to as an RF battery) are considerably influenced by the types and concentrations of impurity element ions in the RF electrolyte. The inventors have found that, by specifying the total concentration (total amount) of impurity element ions contributing to generation of precipitate during a reaction in an RF battery, generation of precipitate can be suppressed. In summary, the RF electrolyte according to this embodiment allows suppression of generation of precipitate, which results in suppression of degradation of battery performance over time, such as battery output or battery capacity.

Herein, the term "element ions" collectively encompasses ions of any valence generated from the same element. Similarly, the term "concentration" denotes a total concentration of ions of any valence generated from the same element. The term "impurity element ions" denotes element ions that are contained in the RF electrolyte and do not contribute to any battery reaction. Accordingly, element ions encompass an active material; however, the active material, which contributes to a battery reaction, is not encompassed in impurity element ions.

(B) The impurity element ions contributing to generation of precipitate include metal element ions and a total concentration of the metal element ions is preferably 195 mass ppm or less.

The impurity element ions contributing to generation of precipitate include metal element ions. Accordingly, the total concentration of the metal element ions in the RF electrolyte is adjusted to thereby suppress generation of precipitate and the resultant degradation of battery performance of the RF battery over time.

(C) The impurity element ions contributing to generation of precipitate include non-metal element ions and a total concentration of the non-metal element ions is preferably 21 mass ppm or less.

The impurity element ions contributing to generation of precipitate include non-metal element ions. Accordingly, the total concentration of the non-metal element ions in the RF electrolyte is adjusted to thereby suppress generation of precipitate and the resultant degradation of battery performance of the RF battery over time. The term "non-metal elements" collectively encompasses elements other than metal elements.

(D) The metal element ions include heavy metal element ions and a total concentration of the heavy metal element ions is preferably 85 mass ppm or less.

The metal element ions contributing to generation of precipitate include heavy metal element ions. Accordingly, the total concentration of the heavy metal element ions in the RF electrolyte is adjusted to thereby suppress generation of precipitate and the resultant degradation of battery performance of the RF battery over time. The term "heavy metal elements" denotes metal elements having a specific gravity of 4 or more.

(E) The metal element ions include light metal element ions and a total concentration of the light metal element ions is preferably 120 mass ppm or less.

The metal element ions contributing to generation of precipitate include light metal element ions. Accordingly, the total concentration of the light metal element ions in the RF electrolyte is adjusted to thereby suppress generation of precipitate and the resultant degradation of battery performance of the RF battery over time. The term "light metal elements" denotes metal elements having a specific gravity of less than 4.

(F) The metal element ions include heavy metal element ions and light metal element ions, a total concentration of the heavy metal element ions is preferably 85 mass ppm or less, and a total concentration of the light metal element ions is preferably 120 mass ppm or less.

When the total concentrations of the heavy metal element ions and the light metal element ions are adjusted to be in the above-described ranges, compared with an RF electrolyte in which only one of these total concentrations is adjusted, generation of precipitate and the resultant degradation of battery performance of the RF battery over time can be suppressed.

(G) The heavy metal element ions preferably satisfy at least one of (1) to (9) below in terms of concentration:
(1) a concentration of chromium (Cr) ions is 10 mass ppm or less,
(2) a concentration of manganese (Mn) ions is 1 mass ppm or less,
(3) a concentration of iron (Fe) ions is 40 mass ppm or less,
(4) a concentration of cobalt (Co) ions is 2 mass ppm or less,
(5) a concentration of nickel (Ni) ions is 5 mass ppm or less,
(6) a concentration of copper (Cu) ions is 1 mass ppm or less,
(7) a concentration of zinc (Zn) ions is 1 mass ppm or less,
(8) a concentration of molybdenum (Mo) ions is 20 mass ppm or less, and
(9) a concentration of antimony (Sb) ions is 1 mass ppm or less.

Among heavy metal element ions, in particular, the above-described heavy metal element ions tend to contribute to generation of precipitate. Accordingly, the concentrations of these heavy metal element ions in the RF electrolyte are adjusted to thereby suppress generation of precipitate and the resultant degradation of battery performance of the RF battery over time. In particular, in vanadium-based RF batteries, some of the above-described heavy metal element ions suppress generation of hydrogen but may contribute to generation of precipitate. Accordingly, by adjusting the concentrations of these heavy metal element ions, degradation of battery performance can be suppressed and energy density can be increased. Such heavy metal element ions include Cr ions and Zn ions, which can have a potential lower than the standard potential of the negative electrode active material of vanadium-based RF batteries ($V^{2+}/V^{3+}$: about −0.26 V).

(H) The light metal element ions preferably satisfy at least one of (10) to (14) below in terms of concentration:
(10) a concentration of sodium (Na) ions is 30 mass ppm or less,
(11) a concentration of magnesium (Mg) ions is 20 mass ppm or less,
(12) a concentration of aluminum (Al) ions is 15 mass ppm or less,
(13) a concentration of potassium (K) ions is 20 mass ppm or less, and
(14) a concentration of calcium (Ca) ions is 30 mass ppm or less.

Among light metal element ions, in particular, the above-described light metal element ions tend to contribute to generation of precipitate. Accordingly, the concentrations of these light metal element ions in the RF electrolyte are limited to thereby suppress generation of precipitate and the resultant degradation of battery performance of the RF battery over time.

(I) The non-metal element ions preferably satisfy at least one of (15) and (16) below in terms of concentration:
(15) a concentration of chloride (Cl) ions is 20 mass ppm or less, and
(16) a concentration of arsenic (As) ions is 1 mass ppm or less.

Among non-metal element ions, in particular, the above-described non-metal element ions tend to contribute to generation of precipitate. Accordingly, the concentrations of these non-metal element ions in the RF electrolyte are adjusted to thereby suppress generation of precipitate and the resultant degradation of battery performance of the RF battery over time.

(J) In the RF electrolyte according to any one of the embodiments (A) to (I), preferably, a concentration of V ions is 1 mol/L or more and 3 mol/L or less, a concentration of free sulfuric acid is 1 mol/L or more and 4 mol/L or less, a concentration of phosphoric acid is $1.0 \times 10^{-4}$ mol/L or more and $7.1 \times 10^{-1}$ mol/L or less, a concentration of ammonium is 20 mass ppm or less, and a concentration of silicon is 40 mass ppm or less.

An RF electrolyte having such a composition can suppress generation of precipitate during a battery reaction and, as a result, can suppress degradation of battery performance over time.

(K) An RF battery according to an embodiment includes the RF electrolyte according to any one of the embodiments (A) to (J).

The RF battery according to this embodiment includes the RF electrolyte in which generation of precipitate is suppressed. As a result, degradation of battery performance over time can be suppressed.

[Details of Embodiments According to the Invention of the Present Application]

RF electrolytes according to embodiments of the invention of the present application will be described below with reference to the drawing. However, the present invention is not limited to these embodiments. The scope of the present invention is indicated by Claims and is intended to embrace all the modifications within the meaning and range of equivalency of the Claims.

Referring to FIG. 1, an RF battery and an RF electrolyte according to embodiments will be described with, as an example, an RF battery 1 employing V ions as a positive electrode active material and a negative electrode active material. In FIG. 1, solid-line arrows indicate changes in valence during charging and broken-line arrows indicate changes in valence during discharging. FIG. 1 indicates only representative valences of the active materials (V ions) and the active materials may have valences other than those indicated in FIG. 1. An active material other than V ions may be contained.

<Overall Configuration of RF Battery>

Representatively, the RF battery 1 is connected via an alternating current/direct current converter to an intermediate position between a power generation unit (for example, a solar photovoltaic power generator, a wind power generator, or another ordinary power plant) and a load (for example, a consumer). The RF battery 1 is charged with power generated by the power generation unit to thereby store the power, or is discharged to provide the stored power to the load. As with existing RF batteries, the RF battery 1 includes a battery cell 100 and a circulation mechanism (tanks, ducts, pumps) for supplying electrolytes to the battery cell 100.

(Battery Cell and Circulation Mechanism)

The battery cell 100 in the RF battery 1 includes a positive electrode cell 102 having a positive electrode 104 therein, a negative electrode cell 103 having a negative electrode 105 therein, and a membrane 101 separating the cells 102 and 103 from each other and being permeable to ions. The positive electrode cell 102 is connected to a positive electrode tank 106 storing a positive electrode electrolyte, through ducts 108 and 110. The negative electrode cell 103 is connected to a negative electrode tank 107 storing a negative electrode electrolyte, through ducts 109 and 111. The ducts 108 and 109 are equipped with pumps 112 and 113 for circulating the electrolytes for the electrodes, respectively. In the battery cell 100, the positive electrode electrolyte in the positive electrode tank 106 and the negative electrode electrolyte in the negative electrode tank 107 are supplied to the positive electrode cell 102 (positive electrode 104) and the negative electrode cell 103 (negative electrode 105) by circulation, respectively, through the ducts 108 to 111 and with the pumps 112 and 113, to charge and discharge the battery through changes in the valence of metal ions (V ions in this embodiment) serving as active materials in the electrolytes at the electrodes.

The battery cell 100 is normally used in a form referred to as a cell stack in which a plurality of cells are stacked. Each cell includes, as components, the positive electrode 104 (positive electrode cell 102), the negative electrode 105 (negative electrode cell 103), and the membrane 101. For the cell stack, cell frames are used: each cell frame includes a bipolar plate (not shown), on one surface of which the positive electrode 104 is to be disposed and on another surface of which the negative electrode 105 is to be disposed; and a frame (not shown) having liquid supply holes for supplying the electrolytes and liquid drainage holes for draining the electrolytes, and formed on the periphery of the bipolar plate. By stacking a plurality of cell frames, the liquid supply holes and the liquid drainage holes form fluid paths for the electrolytes. The fluid paths are connected to the ducts 108 to 111. The cell stack is structured by stacking a cell frame, the positive electrode 104, the membrane 101, the negative electrode 105, a cell frame, . . . , in this order. The basic structure of the RF battery may be appropriately selected from known structures.

(RF Electrolyte)

The RF electrolyte of this embodiment is a liquid in which element ions serving as an active material are contained within a solvent; and the liquid contains, at a very low concentration, impurity element ions contributing to generation of precipitate. As indicated in Test examples described below, if necessary, the concentration of platinum-group element ions can be adjusted to be a predetermined value or less. In this embodiment, as the positive electrode electrolyte and the negative electrode electrolyte, an RF electrolyte containing V ions as the active material is used. In these positive electrode electrolyte and negative electrode electrolyte, V ions preferably have an average valence of 3.3 or more and 3.7 or less and the concentration of V ions is preferably 1 mol/L or more and 3 mol/L. More preferably, the average valence is 3.4 or more and 3.6 or less and the concentration of V ions is 1.5 mol/L or more and 1.9 mol/L or less.

The solvent of the RF electrolyte may be, for example, an aqueous solution of at least one selected from $H_2SO_4$, $K_2SO_4$, $Na_2SO_4$, $H_3PO_4$, $H_4P_2O_7$, $K_2HPO_4$, $Na_3PO_4$, $K_3PO_4$, $HNO_3$, $KNO_3$, $HCl$, and $NaNO_3$. Alternatively, the solvent of the RF electrolyte may be an organic acid solvent.

[Impurity Element Ions Contributing to Generation of Precipitate]

The inventors of the present invention performed studies and, as a result, have found the following findings: when the total amount of impurity element ions contributing to generation of precipitate in an RF electrolyte is 220 mass ppm or less in the RF electrolyte, generation of precipitate (representatively, oxide derived from the active material) can be effectively suppressed. In addition, the inventors have found the following findings: the impurity element ions contributing to generation of precipitate are classified into metal element ions and non-metal element ions, and the metal element ions and the non-metal element ions preferably satisfy certain total concentrations. Thus, generation of precipitate in RF batteries can be effectively suppressed. By selectively removing element ions in a classification that are easily removed from raw materials of the RF electrolyte or the RF electrolyte, a high production efficiency of the RF electrolyte is achieved. Hereinafter, the metal element ions and the non-metal element ions will be described.

(Metal Element Ions)

In the RF electrolyte of this embodiment, the total concentration of metal element ions among impurity element ions contributing to generation of precipitate is preferably 195 mass ppm or less. This is because generation of precipitate in RF batteries can be effectively suppressed.

The metal element ions contributing to generation of precipitate can be further classified into heavy metal element ions and light metal element ions. The total concentration of the metal element ions is preferably 195 mass ppm or less and at least one of the following total concentrations is preferably satisfied: the total concentration of the heavy metal element ions is 85 mass ppm or less and the total concentration of the light metal element ions is 120 mass ppm or less. This is because generation of precipitate in RF batteries can be effectively suppressed.

Examples of heavy metal element ions contributing to generation of precipitate are described below. These heavy metal element ions particularly tend to contribute to generation of precipitate. Accordingly, the concentrations of these heavy metal element ions preferably satisfy concentrations also described below.

(1) Cr ions: 10 mass ppm or less
(2) Mn ions: 1 mass ppm or less
(3) Fe ions: 40 mass ppm or less
(4) Co ions: 2 mass ppm or less
(5) Ni ions: 5 mass ppm or less
(6) Cu ions: 1 mass ppm or less
(7) Zn ions: 1 mass ppm or less
(8) Mo ions: 20 mass ppm or less
(9) Sb ions: 1 mass ppm or less Examples of light metal element ions contributing to generation of precipitate are described below. These light metal element ions particularly tend to contribute to generation of precipitate. Accordingly, the concentrations of these light metal element ions preferably satisfy concentrations also described below.

(10) Na ions: 30 mass ppm or less
(11) Mg ions: 20 mass ppm or less
(12) Al ions: 15 mass ppm or less
(13) K ions: 20 mass ppm or less
(14) Ca ions: 30 mass ppm or less (Non-Metal Element Ions)

Non-metal element ions are ions of elements other than elements classified into metal elements in the periodic table. In the RF electrolyte of this embodiment, the total concentration of non-metal element ions among impurity element ions contributing to generation of precipitate is preferably 21 mass ppm or less. This is because generation of precipitate in RF batteries can be effectively suppressed.

Examples of non-metal element ions contributing to generation of precipitate are described below. These non-metal element ions particularly tend to contribute to generation of precipitate. Accordingly, these non-metal element ions preferably satisfy concentrations also described below.

(15) Cl ions: 20 mass ppm or less
(16) As ions: 1 mass ppm or less

In general, active materials used for redox flow batteries are positively charged. Accordingly, removal of positively charged impurity elements with, for example, a cation exchange membrane from electrolytes may also cause removal of active materials. For this reason, impurity element ions that are classified as anions (for example, Cl ions described above) can be selectively removed with, for example, an anion exchange membrane to thereby adjust the total concentration of impurity element ions. As a result, without unintentional removal of active materials, generation of precipitate can be effectively suppressed.

[Adjustment of Concentration of Impurity Element Ions]

In order to prepare an RF electrolyte in which the total concentration of impurity element ions has been adjusted, it is preferable to use a raw material of the active material and a solvent (for example, sulfuric acid) that have a minimum content of impurity element ions. However, for example, during production steps, impurity element ions may enter an RF electrolyte. Accordingly, if necessary, the total concentration of impurity element ions may be decreased by subjecting an RF electrolyte to a known process such as coagulating sedimentation, solvent extraction, filtration using ion-exchange resin or chelate resin, electrolytic deposition, or membrane separation. In particular, filtration using chelate resin is preferred because, by adjusting properties of the chelate resin or pH of an RF electrolyte, specific element ions can be selectively filtered off. The filtration may be performed by passing an RF electrolyte through, for example, a filter of chelate resin or a column packed with beads of chelate resin.

[Other Classifications]

(1) Iron-Group Element Ions and Non-Iron-Group Element Ions

The inventors of the present invention have also found the following findings: when the metal element ions among impurity element ions contributing to generation of precipitate are classified, not into heavy metal element ions and light metal element ions, but into iron-group element ions and non-iron-group element ions, the iron-group element ions and the non-iron-group element ions preferably satisfy certain total concentrations. The term "iron-group elements" collectively encompasses Fe, Co, and Ni. The term "non-iron-group element ions" denotes metal element ions other than iron-group element ions.

As a result of classification of the metal element ions into iron-group element ions and non-iron-group element ions, an RF electrolyte can be efficiently produced. The iron-group elements, which have similar properties, can be often removed under the same (single) condition during optional removal of impurity element ions from an RF electrolyte. Accordingly, it is not necessary to change conditions in order to remove ions of individual elements and hence an RF electrolyte can be produced at a high productivity. In this case, in the RF electrolyte, the total concentration of the iron-group element ions is preferably 50 mass ppm or less. This is because generation of precipitate in RF batteries can be effectively suppressed.

The total concentration of the non-iron-group element ions contributing to generation of precipitate is preferably 155 mass ppm or less. Since active materials used for RF batteries tend to have properties that are similar to those of Fe, there may be cases where it is difficult to selectively remove only iron-group element ions without causing removal of active materials. Even in such a case, the non-iron-group element ions can be removed, so that, with a low probability of causing removal of active materials, the total amount of impurity element ions contributing to generation of precipitate can be decreased to 220 mass ppm or less.

In summary, in an RF electrolyte in which the total concentration of impurity element ions contributing to generation of precipitate during a battery reaction is 220 mass ppm or less, when metal element ions contributing to generation of precipitate are classified into iron-group element ions and non-iron-group element ions, at least one of (a) and (b) below is preferably satisfied:

(a) the total concentration of the iron-group element ions is 50 mass ppm or less, and (b) the total concentration of the non-iron-group element ions is 155 mass ppm or less.

(2) Iron-Group Element Ions and Other Element Ions

The inventors of the present invention have also found the following findings: when impurity element ions contributing to generation of precipitate are classified into iron-group element ions and other element ions, the iron-group element ions and the other element ions preferably satisfy certain total concentrations. In this classification, as with above, the term "iron-group elements" collectively encompasses Fe, Co, and Ni, which contribute to generation of precipitate. The term "other element ions" denotes element ions other than iron-group element ions, in the impurity element ions contributing to generation of precipitate.

As in (1) above, this classification allows efficient production of an RF electrolyte. In this case, in an RF electrolyte in which the total concentration of impurity element ions contributing to generation of precipitate during a battery reaction is 220 mass ppm or less, at least one of (c) and (d) below is preferably satisfied:

(c) the total concentration of the iron-group element ions is 50 mass ppm or less, and (d) the total concentration of the element ions other than the iron-group element ions in the impurity element ions contributing to generation of precipitate is 180 mass ppm or less.

This is because generation of precipitate in RF batteries can be effectively suppressed.

(3) Element Ions Belonging to Group 9, Element Ions Belonging to Group 10, and Element Ions Belonging to Other Groups The inventors of the present invention have also found the following findings: when impurity element ions contributing to generation of precipitate are classified into element ions belonging to group 9 (group 9 element ions), element ions belonging to group 10 (group 10 element ions), and element ions belonging to other groups (hereafter referred to as other-group element ions), these element ions preferably satisfy certain total concentrations.

The group 9 element ions and the group 10 element ions encompass element ions contributing to generation of precipitate and platinum-group ions promoting generation of hydrogen as indicated in Test examples described below. Since elements in the same group have similar properties, they can be often removed under the same (single) condition during removal of impurity element ions from an RF electrolyte. In the case where it is difficult to remove group 9 element ions or group 10 element ions, the total concentration of element ions of a group that are easily removed or the total concentration of other-group element ions may be adjusted. Accordingly, in the case of this classification, it is not necessary to change conditions in order to remove ions of individual elements.

Thus, this classification allows efficient production of an RF electrolyte. In this case, in an RF electrolyte in which the total concentration of impurity element ions contributing to generation of precipitate is 220 mass ppm or less, impurity element ions contributing to generation of precipitate preferably satisfy at least one of (e) to (g) below:

(e) the total concentration of group 9 element ions is 2 mass ppm or less, (f) the total concentration of group 10 element ions is 5 mass ppm or less, and (g) the total concentration of other-group element ions is 190 mass ppm or less.

This is because generation of precipitate in RF batteries can be effectively suppressed.

(4) Non-Active-Material Element Ions Belonging to the Same Period as that of Active Material Element Ions and Element Ions Belonging to Other Periods The inventors of the present invention have also found the following findings: when impurity element ions contributing to generation of precipitate are classified into non-active-material element ions belonging to the same period as that of active material element ions and element ions belonging to other periods, these element ions preferably satisfy certain total concentrations. For example, when the active material is vanadium and classification is performed between non-vanadium element ions belonging to period 4 and element ions belonging to periods other than period 4, these element ions preferably satisfy certain total concentrations.

Element ions that are not active material element ions and belong to the same period as that of active material element ions (referred to as same-period non-active-material element ions) probably have properties similar to those of active material element ions. Thus, for example, compound oxides containing active material element ions and same-period non-active-material element ions may appear as precipitate. Accordingly, it is effective to decrease the concentration of same-period non-active-material element ions in order to suppress generation of precipitate. However, there are cases where it is difficult to selectively remove same-period non-active-material element ions from active material element ions. Even in these cases, selective removal of element ions belonging to other periods allows a high productivity of an RF electrolyte.

In this case, in an RF electrolyte in which the total concentration of impurity element ions contributing to generation of precipitate during a battery reaction is 220 mass ppm or less, impurity element ions contributing to generation of precipitate preferably satisfy at least one of (h) and (i) below:

(h) the total concentration of element ions belonging to period 4 is 115 mass ppm or less, and (i) the total concentration of element ions not belonging to period 4 is 111 mass ppm or less.

This is because generation of precipitate in RF batteries can be effectively suppressed.

In the above-described classifications (1) to (4), furthermore, in a case where the total concentration of platinum-group element ions satisfies 4.5 mass ppm or less, generation of precipitate can be suppressed and generation of hydrogen can also be suppressed. In such cases, in particular, the following embodiments can be employed. In the classification (2), when element ions in a group constituted by platinum-group element ions and impurity element ions contributing to generation of precipitate are classified into iron-group element ions and element ions other than iron-group element ions in the group, at least one of (c) and (d) is satisfied: (c) the total concentration of the iron-group element ions is 50 mass ppm or less, and (d) the total concentration of the element ions other than the iron-group element ions in the group is 185 mass ppm or less. In the classification (3), when element ions in a group constituted by platinum-group element ions and impurity element ions contributing to generation of precipitate are classified into group 9 element ions, group 10 element ions, and other-group element ions, at least one of (e) to (g) is satisfied: (e) the total concentration of the group 9 element ions is 4 mass ppm or less, (f) the total concentration of the group 10 element ions is 7 mass ppm or less, and (g) the total concentration of the other-group element ions is 190 mass ppm or less. In the classification (4), when element ions in a group constituted by platinum-group element ions and impurity element ions contributing to generation of precipitate are classified into same-period non-active-material element ions and element ions belonging to other periods, at least one of (h) and (i) is satisfied: (h) the total concentration of the same-period non-active-material element ions is 115 mass ppm or less, and (i) the total concentration of the element ions belonging to other periods is 115 mass ppm or less.

[Solvent of Electrolyte]

In the case where an RF electrolyte contains vanadium as the active material and sulfuric acid as the solvent, preferably, the concentration of V ions is 1 mol/L or more and 3 mol/L or less, the concentration of free sulfuric acid is 1 mol/L or more and 4 mol/L or less, the concentration of phosphoric acid is $1.0 \times 10^{-4}$ mol/L or more and $7.1 \times 10^{-1}$ mol/L or less, the concentration of ammonium ($NH_4$) is 20 mass ppm or less, and the concentration of silicon (Si) is 40 mass ppm or less.

By setting the concentration of V ions and the concentration of free sulfuric acid so as to satisfy the above-described specific ranges, the average valence in the RF electrolyte becomes about 3.3 or more and about 3.7 or less. The RF electrolyte satisfying such an average valence is, as a positive electrode electrolyte and also as a negative electrode electrolyte, highly balanced in terms of concentrations of V ions of individual valences. Accordingly, an RF battery employing an RF electrolyte satisfying such an average valence can have a very high capacity. In addition, by setting the concentration of phosphoric acid to be in the above-described specific range and by setting the concentration of $NH_4$ to the above-described specific concentration or less, precipitation of precipitate (for example, ammonium-vanadium compound) during a battery reaction can be suppressed. Furthermore, since Si may cause an adverse effect on the membrane, the concentration of Si is set to the above-described specific concentration or less, so that the adverse effect can be suppressed.

(Tanks and Ducts)

The positive electrode tank 106, the negative electrode tank 107, and the ducts 108 to 111 are members that come into contact with the RF electrolyte. Accordingly, these members (106 to 111) may contain or have thereon impurity element ions contributing to generation of precipitate during a battery reaction or platinum-group element ions. In such a case, as the RF battery 1 is operated, there may be an increase in the contents of the impurity element ions and the platinum-group element ions in the RF electrolyte. For this reason, these members (106 to 111) are preferably formed of materials that do not contain the impurity element ions or the platinum-group element ions. In addition, the steps of producing these members (106 to 111) are preferably performed with things that do not contain the impurity element ions or the platinum-group element ions (for example, a release agent for molds for producing the members, the release agent not containing the impurity element ions or the platinum-group element ions). Examples of the materials forming the members (106 to 111) include an ethylene homopolymer that has a density (ASTM D 1505) within a range of 0.080 g/cm$^3$ or more and 0.960 g/cm$^3$ or less and has a melt flow rate (ASTM D 1238, measurement conditions: 190° C., load of 2.16 kg) within a range of 0.01 g/10 min or more and 20 g/10 min or less; and an ethylene-α olein copolymer having a density and a melt flow rate that fall within the above-described ranges. These descriptions of the members (106 to 111) similarly apply to transport tanks for transporting the RF electrolyte.

Test Example 1

In Test example 1, charge and discharge tests were performed in consideration of RF batteries practically used. A positive electrode and a negative electrode having an electrode area of 500 cm$^2$ and formed of carbon felt were prepared. The total mass of these electrodes was about 35 g. Regarding RF electrolytes, three RF electrolytes having different concentrations of impurity element ions were prepared. These RF electrolytes were used to produce RF batteries of three types having a 2-hour capacity. The prepared RF electrolytes have the following common basic composition.

(Common Basic Composition)
Concentration of V ions: 1.7 mol/L
Average valence of V ions: 3.5
Concentration of free sulfuric acid: 2.0 mol/L
Concentration of phosphoric acid: 0.14 mol/L
Concentration of silicon: 40 mass ppm or less
Concentration of ammonium: 20 mass ppm or less Table I describes the concentrations of impurity element ions of the RF electrolytes used in this Test example. The values in Table I are concentrations (mass ppm). The concentrations of impurity element ions were adjusted, when necessary, by passing RF electrolytes through columns packed with chelate resin. The concentrations of the impurity element ions were measured as follows. The concentration of Cl ions was measured with an ion chromatography system (manufactured by NIPPON DIONEX K. K., ICS-1500). The concentrations of Na ions and K ions were measured with a polarized Zeeman atomic absorption spectrophotometer (manufactured by Hitachi High-Tech Fielding Corporation, Z-6100). The concentrations of the other impurity element ions were measured with an ICP emission spectrometer (manufactured by SHIMADZU CORPORATION, ICPS-8100) or an ICP mass spectrometer (manufactured by Agilent Technologies. Inc., Agilent 7700 ICP-MS).

TABLE I

|  | Test example | | |
| --- | --- | --- | --- |
|  | 1-1 | 1-2 | 1-3 |
| Na | 25.1 | 28.1 | 31.5 |
| Mg | 18.9 | 17.5 | 22.4 |
| Al | 11.4 | 14.1 | 17.5 |
| Cl | 18.5 | 19 | 24.5 |
| K | 19 | 15.5 | 21.8 |
| Ca | 16.5 | 20.5 | 34.8 |
| Cr | 9.5 | 8.5 | 11.4 |
| Mn | 0.8 | 0.8 | 1.2 |
| Fe | 32.5 | 38 | 42.5 |
| Co | 1.5 | 1.8 | 3.5 |
| Ni | 1 | 4.4 | 6.1 |
| Cu | 0.5 | 0.9 | 1.5 |
| Zn | 0.7 | 0.7 | 1.8 |
| As | 0.9 | 0.8 | 2.1 |
| Mo | 19 | 14.5 | 22.4 |
| Rh | 0.9 | 0.9 | 1.2 |
| Pd | 0.8 | 0.5 | 1.1 |
| Sb | 0.9 | 0.6 | 1.2 |
| Ir | 0.5 | 0.8 | 1.2 |
| Pt | 0.4 | 0.7 | 1.5 |
| Total | 179.3 | 188.6 | 251.2 |
| Generation of precipitate | Not occurred | Not occurred | Occurred |
| Increase in cell resistance | Not occurred | Not occurred | Occurred |
| Generation of hydrogen | Not occurred | Not occurred | Occurred |

* Values in Table are given in units of mass ppm

Each RF battery was subjected to a charge and discharge test for 20 cycles and determined as to whether generation of precipitate, an increase in battery resistance (cell resistance), and generation of hydrogen occurred. The generation of precipitate was observed by visual inspection. The generation of hydrogen was detected with a combustible gas detector (manufactured by New Cosmos Electric Co., Ltd., XP-311A). Regarding the cell resistance, an average voltage and an average current during charge and discharge were measured and the cell resistance was determined as average voltage/average current. The cell resistance in the first cycle was compared with the cell resistance in the final cycle to thereby determine as to whether the cell resistance increased.

The charge and discharge conditions were as follows.
(Charge and Discharge Conditions)
Charge-discharge mode: constant current
Current density: 70 (mA/cm$^2$)
End-of-charge voltage: 1.55 (V)
End-of-discharge voltage: 1.00 (V)
Temperature: 25° C.

Table I indicates that, in the tests, in Test example 1-1 and Test example 1-2 in which the total concentration of impurity element ions was 190 mass ppm or less, no generation of precipitate and no increase in cell resistance were observed and no generation of hydrogen was detected. In contrast, regarding the RF electrolyte used in Test example 1-3 in which the total concentration of impurity element ions was more than 250 mass ppm, generation of precipitate in the positive electrode and an increase in cell resistance were observed and generation of hydrogen in the negative electrode was also detected. In summary, it has been demonstrated that the amount of impurity element ions affects generation of precipitate and generation of hydrogen.

Test Example 2

<<Classification 1>>

In view of results of Test example 1, in order to identify, among impurity element ions, those contributing to generation of precipitate and those promoting generation of hydrogen, the impurity element ions were classified into metal elements and non-metal elements. Furthermore, the metal elements were classified into heavy metal elements and light metal elements; and the heavy metal elements were classified into platinum-group elements and other elements. A plurality of electrolytes were prepared so as to have different total concentrations in terms of element ions of these classifications and were studied as to which classification contributes to generation of precipitate and which classification promotes generation of hydrogen. Table II to Table IV describe the concentrations of impurity element ions of the RF electrolytes used in this Test example.

The values in Tables are concentrations (mass ppm). The manner in which the concentrations of impurity element ions were adjusted and the charge and discharge conditions were the same as in Test example 1.

TABLE II

| | | | | Test example | | | | | | | | | |
|---|---|---|---|---|---|---|---|---|---|---|---|---|---|
| | | | | 2-1 | 2-2 | 2-3 | 2-4 | 2-5 | 2-6 | 2-7 | 2-8 | 2-9 | 2-10 |
| Metal | Heavy metal | Platinum group | Total 1 | 4.5 or less | 4.5 or less | 4.5 or less | 4.5 or less | 4.5 or less | 4.5 or lees | 4.5 or less | 4.5 or less | 4.5 or less | 4.5 or less |
| | | Other than platinum group | Cr | 8 | 9 | 8 | 5 | 13.4 | 12.7 | 12.4 | 11.7 | 13.5 | 11.5 |
| | | | Mn | 0.8 | 0.8 | 0.7 | 0.5 | 3.7 | 2.1 | 1.5 | 1.2 | 2.1 | 2.3 |
| | | | Fe | 35 | 38 | 30 | 36 | 45.5 | 40.5 | 42.1 | 41.2 | 22.4 | 40.5 |
| | | | Co | 1 | 1.5 | 1.2 | 1.4 | 4.5 | 4.2 | 3.1 | 2.5 | 3.1 | 2.3 |
| | | | Ni | 4 | 4.2 | 3.8 | 4 | 8.8 | 5.3 | 5.5 | 5.8 | 5.6 | 5.4 |
| | | | Cu | 0.7 | 0.8 | 0.6 | 0.6 | 2.9 | 3 | 1.3 | 1.1 | 1.3 | 1.3 |
| | | | Zn | 0.5 | 0.7 | 0.6 | 0.6 | 2.4 | 1.8 | 1.2 | 2.1 | 1.4 | 1.8 |
| | | | Mo | 16 | 18 | 15 | 16 | 21.9 | 23 | 21.8 | 20.5 | 21.5 | 20.7 |
| | | | Sb | 0.8 | 0.9 | 0.7 | 0.8 | 2.4 | 1.2 | 1.5 | 1.8 | 1.8 | 2 |
| | | | Total 2 | 66.8 | 73.9 | 60.6 | 64.9 | 105.5 | 93.8 | 90.4 | 87.9 | 72.7 | 87.8 |
| | Light metal | | Na | 20 | 27 | 34.5 | 31 | 19.8 | 26.5 | 31 | 30.5 | 31 | 28.1 |
| | | | Mg | 15 | 18 | 21.4 | 23.5 | 13.7 | 16.8 | 21.2 | 22 | 20.5 | 13.4 |
| | | | Al | 10 | 13 | 15.8 | 16 | 12.5 | 13.2 | 16.1 | 16.6 | 16.7 | 14.2 |
| | | | K | 15 | 16 | 22.7 | 22.5 | 12.4 | 16.6 | 21.4 | 21 | 21.3 | 11.4 |
| | | | Ca | 26 | 28 | 34.6 | 36.1 | 24.1 | 21.7 | 30.5 | 31 | 31.5 | 31.4 |
| | | | Total 3 | 86 | 102 | 129 | 129.1 | 82.5 | 94.8 | 120.2 | 121.1 | 121 | 98.5 |
| | Total 2 + Total 3 | | | 152.8 | 175.9 | 189.6 | 194 | 188 | 188.6 | 210.6 | 209 | 193.7 | 186.3 |
| Non-metal | | | Cl | 15 | 18 | 23 | 21 | 25 | 22.2 | 4.8 | 4 | 20.5 | 21.6 |
| | | | As | 0.8 | 0.8 | 1.5 | 1.8 | 2 | 1.5 | 0.7 | 0.6 | 1.3 | 2.1 |
| | | | Total 4 | 15.8 | 18.8 | 24.5 | 22.8 | 27 | 23.7 | 5.5 | 4.6 | 21.8 | 23.7 |
| Total 2 + Total 3 + Total 4 | | | | 168.6 | 194.7 | 214.1 | 216.8 | 215 | 212.3 | 216.1 | 213.8 | 215.5 | 210 |
| Generation of precipitate | | | | Not occurred | Not occurred | Not occurred | Not occurred | Not occurred | Not occurred | Not occurred | Not occurred | Not occurred | Not occurred |
| Increase in cell resistance | | | | Not occurred | Not occurred | Not occurred | Not occurred | Not occurred | Not occurred | Not occurred | Not occurred | Not occurred | Not occurred |
| Generation of hydrogen | | | | Not occurred | Not occurred | Not occurred | Not occurred | Not occurred | Not occurred | Not occurred | Not occurred | Not occurred | Not occurred |

* Values in Table are given in units of mass ppm

TABLE III

| | | | | | 2-11 | 2-12 | 2-13 | 2-14 | 2-15 | 2-16 | 2-17 | 2-18 | 2-19 | 2-20 |
|---|---|---|---|---|---|---|---|---|---|---|---|---|---|---|
| Metal | Heavy metal | Platinum group | Total 1 | | 4.5 or less | 4.5 or less | 4.5 or less | 4.5 or less | 4.5 or less | 4.5 or less | 4.5 or less | 4.5 or less | 4.5 or less | 4.5 or less |
| | | Other than platinum group | Cr | | 13 | 11.3 | 9 | 16 | 11.3 | 11.5 | 92 | 11.5 | 14.2 | 15.1 |
| | | | Mn | | 2 | 3 | 0.5 | 4.1 | 2.4 | 2.5 | 2.4 | 1.2 | 2.1 | 2.2 |
| | | | Fe | | 41 | 43 | 39 | 42 | 50.5 | 44.2 | 43.4 | 28.7 | 45.4 | 45 |
| | | | Co | | 2.3 | 3 | 1 | 3.5 | 3.8 | 3 | 2.4 | 2.4 | 2.4 | 2.3 |
| | | | Ni | | 5.5 | 6.3 | 4.5 | 8 | 9.7 | 7 | 7.1 | 5.1 | 6.1 | 6.2 |
| | | | Cu | | 1.5 | 2 | 0.8 | 1.7 | 3.2 | 1.9 | 1.2 | 5.6 | 1.2 | 1.4 |
| | | | Zn | | 1.3 | 1.5 | 0.7 | 2.2 | 4.6 | 1.6 | 2.1 | 2.4 | 1.8 | 1.7 |
| | | | Mo | | 22 | 24 | 18 | 7 | 31.2 | 28.1 | 22.4 | 20.5 | 20.5 | 21 |
| | | | Sb | | 1.2 | 1.3 | 0.7 | 1.4 | 5.4 | 1.4 | 1.2 | 1.8 | 1.9 | 1.8 |
| | | | Total 2 | | 89.8 | 95.4 | 74.2 | 85.9 | 122.1 | 101.2 | 114.2 | 79.2 | 95.6 | 96.7 |
| | Light metal | | Na | | 31.9 | 31.5 | 33.5 | 37.4 | 15.7 | 41.2 | 31.9 | 34 | 10.4 | 31 |
| | | | Mg | | 22.4 | 22.2 | 22.5 | 28.1 | 10.2 | 35.5 | 22.7 | 21.7 | 22 | 21.5 |
| | | | Al | | 18.5 | 16.5 | 16.4 | 16.5 | 11.8 | 28.9 | 16.8 | 16.8 | 19.4 | 19.8 |
| | | | K | | 25 | 21 | 20.6 | 22.4 | 14.6 | 34.5 | 25.5 | 27.9 | 22.4 | 22.8 |
| | | | Ca | | 34.8 | 31.5 | 31.8 | 31.9 | 22.2 | 31.7 | 31.4 | 35.4 | 41.7 | 42.4 |
| | | | Total 3 | | 132.6 | 122.7 | 124.8 | 136.3 | 74.5 | 171.8 | 128.3 | 135.8 | 115.9 | 137.5 |
| | Total 2 + Total 3 | | | | 222.4 | 218.1 | 198 | 222.2 | 196.6 | 273 | 242.5 | 215 | 211.5 | 234.2 |
| Non-metal | | | Cl | | 22 | 20.5 | 24 | 24.6 | 24 | 21 | 18.5 | 24.4 | 28 | 27.5 |
| | | | As | | 1.3 | 1.1 | 1.4 | 1.4 | 2.1 | 1.1 | 0.9 | 1.4 | 1.4 | 1.5 |
| | | | Total 4 | | 23.3 | 21.6 | 25.4 | 26 | 26.1 | 22.1 | 19.4 | 25.8 | 29.4 | 29 |
| Total 2 + Total 3 + Table 4 | | | | | 245.7 | 239.7 | 224.4 | 248.2 | 222.7 | 295.1 | 261.9 | 240.8 | 240.9 | 263.2 |
| Generation of precipitate | | | | | Occurred | Occurred | Occurred | Occurred | Occurred | Occurred | Occurred | Occurred | Occurred | Occurred |
| Increase in cell resistance | | | | | Occurred | Occurred | Occurred | Occurred | Occurred | Occurred | Occurred | Occurred | Occurred | Occurred |
| Generation of hydrogen | | | | | Not occurred | Not occurred | Not occurred | Not occurred | Not occurred | Not occurred | Not Occurred | Not occurred | Not occurred | Not occurred |

* Values in Table are given in units of mass ppm

TABLE IV

| | | 2-21 | 2-22 | 2-23 | 2-24 | 2-25 | 2-26 | 2-27 |
|---|---|---|---|---|---|---|---|---|
| Platinum group | Rh | 0.5 | 0.8 | 1.2 | 1.1 | 1.1 | 1.5 | 1.4 |
| | Pd | 0.5 | 0.9 | 1.1 | 1.1 | 1.2 | 1.2 | 1.3 |
| | Ir | 0.5 | 0.9 | 0.5 | 1.2 | 1.3 | 0.8 | 0.7 |
| | Pt | 0.5 | 0.9 | 1.1 | 0.6 | 1.2 | 1.3 | 1.2 |
| Total | | 2 | 3.5 | 3.9 | 4 | 4.8 | 4.8 | 4.6 |
| Total of the others | | 220 or less | 220 or less | 220 or less | 220 or less | 220 or less | 220 or less | 220 or less |
| Generation of precipitate | | Not occurred | Not occurred | Not occurred | Not occurred | Not occurred | Not occurred | Not occurred |
| Increase in cell resistance | | Not occurred | Not occurred | Not occurred | Not oocurred | Not occurred | Not occurred | Not occurred |
| Generation of hydrogen | | Not occurred | Not occurred | Not occurred | Not occurred | Occurred | Occurred | Occurred |

* Values in Table are given in units of mass ppm

Table II to Table IV indicate that, from the tests in which impurity element ions were classified in the above-described manner, platinum-group element ions contribute to generation of hydrogen and the other impurity element ions contribute to generation of precipitate.

In addition, Table I to Table IV indicate the following facts.

When the total concentration of impurity element ions contributing to generation of precipitate is 220 mass ppm or less, generation of precipitate can be suppressed.

When the total concentration of platinum-group element ions is 4.5 mass ppm or less, generation of hydrogen can be suppressed.

Among impurity element ions contributing to generation of precipitate, the total concentration of metal element ions is preferably 195 mass ppm or less (for example, refer to Test example 2-4).

Among impurity element ions contributing to generation of precipitate, the total concentration of non-metal element ions is preferably 21 mass ppm or less (for example, refer to Test example 1-2).

Among impurity element ions contributing to generation of precipitate, the total concentration of heavy metal element ions is preferably 85 mass ppm or less (for example, refer to and compare Test example 1-2 and Test example 1-3).

Among impurity element ions contributing to generation of precipitate, the total concentration of light metal element ions is preferably 120 mass ppm or less (for example, refer to and compare Test example 1-2 and Test example 1-3).

Among impurity element ions contributing to generation of precipitate, the total concentration of heavy metal element ions is preferably 85 mass ppm or less, and the total concentration of light metal element ions is preferably 120 mass ppm or less (for example, refer to Test example 2-2).

The impurity element ions preferably satisfy those described below (for example, refer to Table I).

(1) Cr ions: 10 mass ppm or less, (2) Mn ions: 1 mass ppm or less, (3) Fe ions: 40 mass ppm or less, (4) Co ions: 2 mass ppm or less, (5) Ni ions: 5 mass ppm or less, (6) Cu ions: 1 mass ppm or less, (7) Zn ions: 1 mass ppm or less, (8) Mo ions: 20 mass ppm or less, (9) Sb ions: 1 mass ppm or less, (10) Na ions: 30 mass ppm or less, (11) Mg ions: 20 mass ppm or less, (12) Al ions: 15 mass ppm or less, (13) K ions: 20 mass ppm or less, (14) Ca ions: 30 mass ppm or less, (15) Cl ions: 20 mass ppm or less, (16) As ions: 1 mass ppm or less, (17) Rh ions: 1 mass ppm or less, (18) Pd ions: 1 mass ppm or less, (19) Ir ions: 1 mass ppm or less, (20) Pt ions: 1 mass ppm or less <<Classification 2>>

Table V and Table VI below describe results of cases where metal element ions contributing to generation of precipitate were classified into iron-group element ions and non-iron-group element ions.

TABLE V

| | | | | Text example | | | | | | | | | |
|---|---|---|---|---|---|---|---|---|---|---|---|---|---|
| | | | | 2-1 | 2-2 | 2-3 | 2-4 | 2-5 | 2-6 | 2-7 | 2-8 | 2-9 | 2-10 |
| Metal | Platinum group | Total 1 | | 4.5 or less | 4.5 or less | 4.5 or less | 4.5 or less | 4.5 or less | 4.5 or less | 4.5 or less | 4.5 or less | 4.5 or less | 4.5 or less |
| | Iron group | Fe | | 35 | 38 | 30 | 36 | 45.5 | 40.5 | 42.1 | 41.2 | 22.4 | 40.5 |
| | | Co | | 1 | 1.5 | 1.2 | 1.4 | 4.5 | 4.2 | 3.1 | 2.5 | 3.1 | 2.3 |
| | | Ni | | 4 | 4.2 | 3.8 | 4 | 8.8 | 5.3 | 5.5 | 5.8 | 5.6 | 5.4 |
| | | Total 2 | | 40 | 43.7 | 35 | 41.4 | 58.8 | 50 | 50.7 | 49.5 | 31.1 | 48.2 |
| | Other than iron group | Na | | 20 | 27 | 34.5 | 31 | 19.8 | 26.5 | 31 | 30.5 | 31 | 28.1 |
| | | Mg | | 15 | 18 | 21.4 | 23.5 | 13.7 | 16.8 | 21.2 | 22 | 20.5 | 13.4 |
| | | Al | | 10 | 18 | 15.8 | 16 | 12.5 | 13.2 | 16.1 | 16.6 | 16.7 | 14.2 |
| | | K | | 15 | 16 | 22.7 | 22.5 | 12.4 | 16.6 | 21.4 | 21 | 21.3 | 11.4 |
| | | Ca | | 26 | 28 | 34.6 | 36.1 | 24.1 | 21.7 | 30.5 | 31 | 31.5 | 31.4 |
| | | Cr | | 8 | 8 | 8 | 5 | 13.4 | 12.7 | 12.4 | 11.7 | 13.5 | 11.5 |
| | | Mn | | 0.8 | 0.8 | 0.7 | 0.5 | 3.7 | 2.1 | 1.5 | 1.2 | 2.1 | 2.3 |
| | | Cu | | 0.7 | 0.8 | 0.6 | 0.6 | 2.9 | 3 | 1.3 | 1.1 | 1.3 | 1.3 |
| | | Zn | | 0.6 | 0.7 | 0.6 | 0.6 | 2.4 | 1.8 | 1.2 | 2.1 | 1.4 | 1.8 |
| | | Mo | | 16 | 18 | 15 | 16 | 21.9 | 23 | 21.8 | 20.5 | 21.5 | 20.7 |
| | | Sb | | 0.8 | 0.9 | 0.7 | 0.8 | 2.4 | 1.2 | 1.6 | 1.8 | 1.8 | 2 |
| | | Total 3 | | 112.8 | 132.2 | 154.6 | 152.6 | 129.2 | 138.6 | 159.9 | 159.6 | 162.6 | 138.1 |
| | Total 2 + Total 3 | | | 152.8 | 175.9 | 189.6 | 194 | 188 | 188.6 | 210.6 | 209 | 193.7 | 186.3 |
| Non metal | | Cl | | 15 | 18 | 23 | 21 | 25 | 22.2 | 4.8 | 4 | 20.5 | 21.6 |
| | | As | | 0.8 | 0.8 | 1.5 | 1.8 | 2 | 1.5 | 0.7 | 0.6 | 1.3 | 2.1 |
| | | Total 4 | | 15.8 | 18.8 | 24.5 | 22.8 | 27 | 23.7 | 5.5 | 4.6 | 21.8 | 23.7 |
| Total 2 + Total 3 + Total 4 | | | | 188.6 | 194.7 | 214.1 | 216.8 | 215 | 212.3 | 216.1 | 213.6 | 215.5 | 210 |
| Generation of precipitate | | | | Not occurred | Not occurred | Not occurred | Not occurred | Not occurred | Not occurred | Not occurred | Not occurred | Not occurred | Not occurred |
| Increase in cell resistance | | | | Not occurred | Not occurred | Not occurred | Not occurred | Not occurred | Not occurred | Not occurred | Not occurred | Not occurred | Not occurred |
| Generation of hydrogen | | | | Not occurred | Not occurred | Not occurred | Not occurred | Not occurred | Not occurred | Not occurred | Not occurred | Not occurred | Not occurred |

* Values in Table are given in units of mass ppm

TABLE VI

| | | | | Text example | | | | | | | | | |
|---|---|---|---|---|---|---|---|---|---|---|---|---|---|
| | | | | 2-11 | 2-12 | 2-13 | 2-14 | 2-15 | 2-16 | 2-17 | 2-18 | 2-19 | 2-20 |
| Metal | Platinum group | Total 1 | | 4.5 or less | 4.5 or less | 4.5 or less | 4.5 or less | 4.5 or less | 4.5 or less | 4.5 or less | 4.5 or less | 4.5 or less | 4.5 or less |
| | Iron group | Fe | | 41 | 43 | 39 | 42 | 50.5 | 44.2 | 43.4 | 28.7 | 45.4 | 45 |
| | | Co | | 2.3 | 3 | 1 | 3.5 | 3.8 | 3 | 2.4 | 2.4 | 2.4 | 2.3 |
| | | Ni | | 5.5 | 6.3 | 4.5 | 8 | 9.7 | 7 | 7.1 | 5.1 | 6.1 | 6.2 |
| | | Total 2 | | 48.8 | 52.3 | 44.5 | 53.5 | 64 | 54.2 | 52.9 | 36.2 | 53.9 | 53.5 |
| | Other than iron group | Na | | 31.9 | 31.5 | 33.5 | 37.4 | 15.7 | 41.2 | 31.9 | 34 | 10.4 | 31 |
| | | Mg | | 22.4 | 22.2 | 22.5 | 28.1 | 10.2 | 35.5 | 22.7 | 21.7 | 22 | 21.5 |

TABLE VI-continued

|  |  | Text example | | | | | | | | | |
|---|---|---|---|---|---|---|---|---|---|---|---|
|  |  | 2-11 | 2-12 | 2-13 | 2-14 | 2-15 | 2-16 | 2-17 | 2-18 | 2-19 | 2-20 |
|  | Al | 18.5 | 16.5 | 16.4 | 16.5 | 11.8 | 28.9 | 16.8 | 16.8 | 19.4 | 19.8 |
|  | K | 25 | 21 | 20.6 | 22.4 | 14.6 | 34.5 | 25.5 | 27.9 | 22.4 | 22.8 |
|  | Ca | 34.8 | 31.5 | 31.8 | 31.9 | 22.2 | 31.7 | 31.4 | 35.4 | 41.7 | 42.4 |
|  | Cr | 13 | 11.3 | 9 | 16 | 11.3 | 11.5 | 32 | 11.5 | 14.2 | 15.1 |
|  | Mn | 2 | 3 | 0.5 | 4.1 | 2.4 | 2.5 | 2.4 | 1.2 | 2.1 | 2.2 |
|  | Cu | 1.5 | 2 | 0.8 | 1.7 | 3.2 | 1.9 | 1.2 | 5.6 | 1.2 | 1.4 |
|  | Zn | 1.3 | 1.5 | 0.7 | 2.2 | 4.6 | 1.6 | 2.1 | 2.4 | 1.8 | 1.7 |
|  | Mo | 22 | 24 | 18 | 7 | 31.2 | 28.1 | 22.4 | 20.5 | 20.5 | 21 |
|  | Sb | 1.2 | 1.3 | 0.7 | 1.4 | 5.4 | 1.4 | 1.2 | 1.8 | 1.9 | 1.8 |
|  | Total 3 | 173.6 | 165.8 | 154.5 | 168.7 | 132.6 | 218.8 | 189.6 | 178.8 | 157.6 | 180.7 |
| Total 2 + Total 3 |  | 222.4 | 218.1 | 199 | 222.2 | 196.6 | 273 | 242.5 | 215 | 211.5 | 234.2 |
| Non metal | Cl | 22 | 20.5 | 24 | 24.6 | 24 | 21 | 18.5 | 24.4 | 28 | 27.5 |
|  | As | 1.3 | 1.1 | 1.4 | 1.4 | 2.1 | 1.1 | 0.9 | 1.4 | 1.4 | 1.5 |
|  | Total 4 | 23.3 | 21.6 | 25.4 | 26 | 26.1 | 22.1 | 19.4 | 25.8 | 29.4 | 29 |
| Total 2 + Total 3 + Total 4 |  | 246.7 | 239.7 | 224.4 | 248.2 | 222.7 | 295.1 | 261.9 | 240.8 | 240.9 | 263.2 |
| Generation of precipitate |  | Occurred | Occurred | Occurred | Occurred | Occurred | Occurred | Occurred | Occurred | Occurred | Occurred |
| Increase in cell resistance |  | Occurred | Occurred | Occurred | Occurred | Occurred | Occurred | Occurred | Occurred | Occurred | Occurred |
| Generation of hydrogen |  | Not occurred | Not occurred | Not occurred | Not occurred | Not occurred | Not occurred | Not occurred | Not occurred | Not occurred | Not occurred |

* Values in Table are given in units of mass ppm

Table V and Table VI indicate that, when the total of impurity element ions is 220 mass ppm or less, generation of precipitate can be suppressed. In particular, Table V indicates that, when the concentration of impurity element ions contributing to generation of precipitate is 220 mass ppm or less and the concentration of metal element ions among the impurity element ions is 195 mass ppm or less, one or both of the following can be satisfied: the total concentration of iron-group element ions is 50 mass ppm or less and the total concentration of non-iron-group element ions is 155 mass ppm or less; or one or both of the following can be satisfied: the total concentration of iron-group element ions is 45 mass ppm or less and the total concentration of non-iron-group element ions is 135 mass ppm or less.

<<Classification 3>>

In addition, Table VII and Table VIII describe results of cases where a group constituted by platinum-group element ions and impurity element ions contributing to generation of precipitate was classified into iron-group element ions and other element ions. Here, the value of platinum-group element ions was set to 4.5 mass ppm.

TABLE VII

|  |  | Test example | | | | | | | | | |
|---|---|---|---|---|---|---|---|---|---|---|---|
|  |  | 2-1 | 2-2 | 2-3 | 2-4 | 2-5 | 2-6 | 2-7 | 2-8 | 2-9 | 2-10 |
| Iron group | Fe | 35 | 38 | 30 | 36 | 45.5 | 40.5 | 42.1 | 41.2 | 22.4 | 40.5 |
|  | Co | 1 | 1.5 | 1.2 | 1.4 | 4.5 | 4.2 | 3.1 | 2.5 | 3.1 | 2.3 |
|  | Ni | 4 | 4.2 | 3.8 | 4 | 8.8 | 5.3 | 5.5 | 5.8 | 5.6 | 5.4 |
|  | Total 1 | 40 | 43.7 | 35 | 41.4 | 58.8 | 50 | 50.7 | 49.5 | 31.1 | 48.2 |
| Other than iron group | Na | 20 | 27 | 34.5 | 31 | 19.8 | 26.5 | 31 | 30.5 | 31 | 28.1 |
|  | Mg | 15 | 18 | 21.4 | 23.5 | 13.7 | 16.8 | 21.2 | 22 | 20.5 | 13.4 |
|  | Al | 10 | 13 | 15.8 | 16 | 12.5 | 13.2 | 16.1 | 16.6 | 16.7 | 14.2 |
|  | K | 15 | 16 | 22.7 | 22.5 | 12.4 | 16.6 | 21.4 | 21 | 21.3 | 11.4 |
|  | Ca | 26 | 28 | 34.6 | 36.1 | 24.1 | 21.7 | 30.5 | 31 | 31.5 | 31.4 |
|  | Cl | 15 | 18 | 23 | 21 | 25 | 22.2 | 4.8 | 4 | 20.5 | 21.6 |
|  | Cr | 8 | 9 | 8 | 5 | 13.4 | 12.7 | 12.4 | 11.7 | 13.5 | 11.5 |
|  | Mn | 0.8 | 0.8 | 0.7 | 0.5 | 3.7 | 2.1 | 1.5 | 1.2 | 2.1 | 2.3 |
|  | Cu | 0.7 | 0.8 | 0.6 | 0.6 | 2.9 | 3 | 1.3 | 1.1 | 1.3 | 1.3 |
|  | Zn | 0.5 | 0.7 | 0.6 | 0.6 | 2.4 | 1.8 | 1.2 | 2.1 | 1.4 | 1.8 |
|  | Mo | 16 | 18 | 15 | 16 | 21.9 | 23 | 21.8 | 20.5 | 21.5 | 20.7 |
|  | As | 0.8 | 0.8 | 1.5 | 1.8 | 2 | 1.5 | 0.7 | 0.6 | 1.3 | 2.1 |
|  | Sb | 0.8 | 0.9 | 0.7 | 0.8 | 2.4 | 1.2 | 1.5 | 1.8 | 1.8 | 2 |
|  | Platinum group | 4.5 | 4.5 | 4.5 | 4.5 | 4.5 | 4.5 | 4.5 | 4.5 | 4.5 | 4.5 |
|  | Total 2 | 133.1 | 155.5 | 183.6 | 179.9 | 160.7 | 166.8 | 169.9 | 168.6 | 188.9 | 166.3 |
| Total 1 + Total 2 |  | 173.1 | 199.2 | 218.6 | 221.3 | 219.5 | 216.8 | 220.6 | 218.1 | 220 | 214.5 |
| Generation of precipitate |  | Not occurred | Not occurred | Not occurred | Not occurred | Not occurred | Not occurred | Not occurred | Not occurred | Not occurred | Not occurred |
| Increase in cell resistance |  | Not occurred | Not occurred | Not occurred | Not occurred | Not occurred | Not occurred | Not occurred | Not occurred | Not occurred | Not occurred |

TABLE VII-continued

| | Test example | | | | | | | | | |
|---|---|---|---|---|---|---|---|---|---|---|
| | 2-1 | 2-2 | 2-3 | 2-4 | 2-5 | 2-6 | 2-7 | 2-8 | 2-9 | 2-10 |
| Generation of hydrogen | Not occurred | Not occurred | Not occurred | Not occurred | Not occurred | Not occurred | Not occurred | Not occurred | Not occurred | Not occurred |

* Values in Table are given in units of mass ppm

TABLE VIII

| | | Test example | | | | | | | | | |
|---|---|---|---|---|---|---|---|---|---|---|---|
| | | 2-11 | 2-12 | 2-13 | 2-14 | 2-15 | 2-16 | 2-17 | 2-18 | 2-19 | 2-20 |
| Iron group | Fe | 41 | 43 | 39 | 42 | 50.5 | 44.2 | 43.4 | 28.7 | 45.4 | 45 |
| | Co | 2.3 | 3 | 1 | 3.5 | 3.8 | 3 | 2.4 | 2.4 | 2.4 | 2.3 |
| | Ni | 5.5 | 6.3 | 4.5 | 8 | 9.7 | 7 | 7.1 | 5.1 | 6.1 | 6.2 |
| | Total 1 | 48.8 | 52.3 | 44.5 | 53.5 | 64 | 54.2 | 52.9 | 36.2 | 53.9 | 53.5 |
| Other than iron group | Na | 31.9 | 31.5 | 33.5 | 37.4 | 15.7 | 41.2 | 31.9 | 34 | 10.4 | 31 |
| | Mg | 22.4 | 22.2 | 22.5 | 28.1 | 10.2 | 35.5 | 22.7 | 21.7 | 22 | 21.5 |
| | Al | 18.5 | 16.5 | 16.4 | 16.5 | 11.8 | 28.9 | 16.8 | 16.8 | 19.4 | 19.8 |
| | K | 25 | 21 | 20.6 | 22.4 | 14.6 | 34.5 | 25.5 | 27.9 | 22.4 | 22.8 |
| | Ca | 34.8 | 31.5 | 31.8 | 31.9 | 22.2 | 31.7 | 31.4 | 35.4 | 41.7 | 42.4 |
| | Cl | 22 | 20.5 | 24 | 24.6 | 24 | 21 | 18.5 | 24.4 | 28 | 27.5 |
| | Cr | 13 | 11.3 | 9 | 16 | 11.3 | 11.5 | 32 | 11.5 | 14.2 | 15.1 |
| | Mn | 2 | 3 | 0.5 | 4.1 | 2.4 | 2.5 | 2.4 | 1.2 | 2.1 | 2.2 |
| | Cu | 1.5 | 2 | 0.8 | 1.7 | 3.2 | 1.9 | 1.2 | 5.6 | 1.2 | 1.4 |
| | Zn | 1.3 | 1.5 | 0.7 | 2.2 | 4.6 | 1.6 | 2.1 | 2.4 | 1.8 | 1.7 |
| | Mo | 22 | 24 | 18 | 7 | 31.2 | 28.1 | 22.4 | 20.5 | 20.5 | 21 |
| | As | 1.3 | 1.1 | 1.4 | 1.4 | 2.1 | 1.1 | 0.9 | 1.4 | 1.4 | 1.5 |
| | Sb | 1.2 | 1.3 | 0.7 | 1.4 | 5.4 | 1.4 | 1.2 | 1.8 | 1.9 | 1.8 |
| | Platinum group | 4.5 | 4.5 | 4.5 | 4.5 | 4.5 | 4.5 | 4.5 | 4.5 | 4.5 | 4.5 |
| | Total 2 | 201.4 | 191.9 | 184.4 | 199.2 | 163.2 | 245.4 | 213.5 | 209.1 | 191.5 | 214.2 |
| Total 1 + Total 2 | | 250.2 | 244.2 | 228.9 | 252.7 | 227.2 | 299.6 | 266.4 | 245.3 | 245.4 | 267.7 |
| Generation of precipitate | | Occurred | Occurred | Occurred | Occurred | Occurred | Occurred | Occurred | Occurred | Occurred | Occurred |
| Increase in cell resistance | | Occurred | Occurred | Occurred | Occurred | Occurred | Occurred | Occurred | Occurred | Occurred | Occurred |
| Generation of hydrogen | | Not Occurred | Not occurred | Not occurred | Not occurred | Not occurred | Not occurred | Not occurred | Not occurred | Not occurred | Not occurred |

* Values in Table are given in units of mass ppm

Table VII and Table VIII indicate that, when the total concentration of impurity element ions contributing to generation of precipitate is 220 mass ppm or less, generation of precipitate can be suppressed; in addition, when the total of impurity element ions is 224.5 mass ppm or less, generation of precipitate and generation of hydrogen can be suppressed. In particular, Table VII indicates that, regarding impurity element ions contributing to generation of precipitate, one or both of the following can be satisfied: the total concentration of iron-group element ions is 50 mass ppm or less and the concentration of non-iron-group element ions is 180 mass ppm or less; or, regarding impurity element ions contributing to generation of precipitate, one or both of the following can be satisfied: the total concentration of iron-group element ions is 45 mass ppm or less and the total concentration of non-iron-group element ions is 160 mass ppm or less.

<<Classification 4>>

Table IX below describes results of cases where element ions in a group constituted by platinum-group element ions and impurity element ions contributing to generation of precipitate were classified into group 9 element ions, group 10 element ions, and other-group element ions.

TABLE IX

| | | Test example | | |
|---|---|---|---|---|
| | | 1-1 | 1-2 | 1-3 |
| Group 9 | Co | 1.5 | 1.8 | 3.5 |
| | Rh | 0.9 | 0.9 | 1.2 |
| | Ir | 0.5 | 0.8 | 1.2 |
| | Total 1 | 2.9 | 3.5 | 5.9 |
| Group 10 | Ni | 1 | 4.4 | 6.1 |
| | Pd | 0.8 | 0.5 | 1.1 |
| | Pt | 0.4 | 0.7 | 1.5 |
| | Total 2 | 2.2 | 5.6 | 8.7 |
| Other groups | Na | 25.1 | 28.1 | 31.5 |
| | Mg | 18.9 | 17.5 | 22.4 |
| | Al | 11.4 | 14.1 | 17.5 |
| | Cl | 18.5 | 19 | 24.5 |
| | K | 19 | 15.5 | 21.8 |
| | Ca | 16.5 | 20.5 | 34.8 |
| | Cr | 9.5 | 8.5 | 11.4 |
| | Mn | 0.8 | 0.8 | 1.2 |
| | Fe | 32.5 | 38 | 42.5 |
| | Cu | 0.5 | 0.9 | 1.5 |
| | Zn | 0.7 | 0.7 | 1.8 |
| | As | 0.9 | 0.8 | 2.1 |
| | Mo | 19 | 14.5 | 22.4 |

TABLE IX-continued

|  | Test example | | |
|---|---|---|---|
|  | 1-1 | 1-2 | 1-3 |
| Sb | 0.9 | 0.6 | 1.2 |
| Total 3 | 174.2 | 179.5 | 236.6 |
| Total 1 + Total 2 + Total 3 | 179.3 | 188.6 | 251.2 |
| Generation of precipitate | Not occurred | Not occurred | Occurred |
| Increase in cell resistance | Not occurred | Not occurred | Occurred |
| Generation of hydrogen | Not occurred | Not occurred | Occurred |

*Values in Table are given in units of mass ppm

Table IX indicates that, when the total concentration of impurity element ions contributing to generation of precipitate is 220 mass ppm or less, generation of precipitate can be suppressed; in addition, when the total of impurity element ions is 224.5 mass ppm or less, generation of precipitate and generation of hydrogen can be suppressed. In particular, when impurity element ions contributing to generation of precipitate are classified into group 9 element ions, group 10 element ions, and other-group element ions, at least one of the following can be satisfied: the total concentration of group 9 element ions is 2 mass ppm or less, the total concentration of group 10 element ions is 5 mass ppm or less, and the total concentration of other-group element ions is 190 mass ppm or less.

<<Classification 5>>

Table X and Table XI below describe results of cases where element ions in a group constituted by platinum-group element ions and impurity element ions contributing to generation of precipitate were classified into non-active-material element ions belonging to the same period as that of active material element ions and element ions belonging to other periods. Here, the value of platinum-group element ions was set to 4.5 mass ppm.

TABLE X

| | | Test example | | | | | | | | | |
|---|---|---|---|---|---|---|---|---|---|---|---|
| | | 2-1 | 2-2 | 2-3 | 2-4 | 2-5 | 2-6 | 2-7 | 2-8 | 2-9 | 2-10 |
| In the same period as that of active material | K | 15 | 16 | 22.7 | 22.5 | 12.4 | 16.6 | 21.4 | 21 | 21.3 | 11.4 |
| | Ca | 26 | 28 | 34.6 | 36.1 | 24.1 | 21.7 | 30.5 | 31 | 31.5 | 31.4 |
| | Cr | 8 | 9 | 8 | 5 | 13.4 | 12.7 | 12.4 | 11.7 | 13.5 | 11.5 |
| | Mn | 0.8 | 0.8 | 0.7 | 0.5 | 3.7 | 2.1 | 1.5 | 1.2 | 2.1 | 2.3 |
| | Fe | 35 | 38 | 30 | 36 | 45.5 | 40.5 | 42.1 | 41.2 | 22.4 | 40.5 |
| | Co | 1 | 1.5 | 1.2 | 1.4 | 4.5 | 4.2 | 3.1 | 2.5 | 3.1 | 2.3 |
| | Ni | 4 | 4.2 | 3.8 | 4 | 8.8 | 5.3 | 5.5 | 5.8 | 5.6 | 5.4 |
| | Cu | 0.7 | 0.8 | 0.6 | 0.6 | 2.9 | 3 | 1.3 | 1.1 | 1.3 | 1.3 |
| | Zn | 0.5 | 0.7 | 0.6 | 0.6 | 2.4 | 1.8 | 1.2 | 2.1 | 1.4 | 1.8 |
| | As | 0.8 | 0.8 | 1.5 | 1.8 | 2 | 1.5 | 0.7 | 0.6 | 1.3 | 2.1 |
| | Total 1 | 91.8 | 99.8 | 103.7 | 108.5 | 119.7 | 109.4 | 119.7 | 118.2 | 103.5 | 110 |
| In other periods | Na | 20 | 27 | 34.5 | 31 | 19.8 | 26.5 | 31 | 30.5 | 31 | 28.1 |
| | Mg | 15 | 18 | 21.4 | 23.5 | 13.7 | 16.8 | 21.2 | 22 | 20.5 | 13.4 |
| | Al | 10 | 13 | 15.8 | 16 | 12.5 | 13.2 | 16.1 | 16.6 | 16.7 | 14.2 |
| | Cl | 15 | 18 | 23 | 21 | 25 | 22.2 | 4.8 | 4 | 20.5 | 21.6 |
| | Mo | 16 | 18 | 15 | 16 | 21.9 | 23 | 21.8 | 20.5 | 21.5 | 20.7 |
| | Sb | 0.8 | 0.9 | 0.7 | 0.8 | 2.4 | 1.2 | 1.5 | 1.8 | 1.8 | 2 |
| | Platinum group | 4.5 | 4.5 | 4.5 | 4.5 | 4.5 | 4.5 | 4.5 | 4.5 | 4.5 | 4.5 |
| | Total 2 | 81.3 | 99.4 | 114.9 | 112.8 | 99.8 | 107.4 | 100.9 | 99.9 | 116.5 | 104.5 |
| Total 1 + Total 2 | | 173.1 | 199.2 | 218.6 | 221.3 | 219.5 | 216.8 | 220.6 | 218.1 | 220 | 214.5 |
| Generation of precipitate | | Not occurred | Not occurred | Not occurred | Not occurred | Not occurred | Not occurred | Not occurred | Not occurred | Not occurred | Not occurred |
| Increase in cell resistance | | Not occurred | Not occurred | Not occurred | Not occurred | Not occurred | Not occurred | Not occurred | Not occurred | Not occurred | Not occurred |
| Generation of hydrogen | | Not occurred | Not occurred | Not occurred | Not occurred | Not occurred | Not occurred | Not occurred | Not occurred | Not occurred | Not occurred |

* Values in Table are given in units of mass ppm

TABLE XI

| | | Test example | | | | | | | | | |
|---|---|---|---|---|---|---|---|---|---|---|---|
| | | 2-11 | 2-12 | 2-13 | 2-14 | 2-15 | 2-16 | 2-17 | 2-18 | 2-19 | 2-20 |
| In the same period as that of active material | K | 25 | 21 | 20.6 | 22.4 | 14.6 | 34.5 | 25.5 | 27.9 | 22.4 | 22.8 |
| | Ca | 34.8 | 31.5 | 31.8 | 31.9 | 22.2 | 31.7 | 31.4 | 35.4 | 41.7 | 42.4 |
| | Cr | 13 | 11.3 | 9 | 16 | 11.3 | 11.5 | 32 | 11.5 | 14.2 | 15.1 |
| | Mn | 2 | 3 | 0.5 | 4.1 | 2.4 | 2.5 | 2.4 | 1.2 | 2.1 | 2.2 |
| | Fe | 41 | 43 | 39 | 42 | 50.5 | 44.2 | 43.4 | 28.7 | 45.4 | 45 |
| | Co | 2.3 | 3 | 1 | 3.5 | 3.8 | 3 | 2.4 | 2.4 | 2.4 | 2.3 |
| | Ni | 5.5 | 6.3 | 4.5 | 8 | 9.7 | 7 | 7.1 | 5.1 | 6.1 | 6.2 |
| | Cu | 1.5 | 2 | 0.8 | 1.7 | 3.2 | 1.9 | 1.2 | 5.6 | 1.2 | 1.4 |

TABLE XI-continued

|  |  | Test example | | | | | | | | | |
|---|---|---|---|---|---|---|---|---|---|---|---|
|  |  | 2-11 | 2-12 | 2-13 | 2-14 | 2-15 | 2-16 | 2-17 | 2-18 | 2-19 | 2-20 |
|  | Zn | 1.3 | 1.5 | 0.7 | 2.2 | 4.6 | 1.6 | 2.1 | 2.4 | 1.8 | 1.7 |
|  | As | 1.3 | 1.1 | 1.4 | 1.4 | 2.1 | 1.1 | 0.9 | 1.4 | 1.4 | 1.5 |
|  | Total 1 | 127.7 | 123.7 | 109.3 | 133.2 | 124.4 | 139 | 148.4 | 121.6 | 138.7 | 140.6 |
| In other periods | Na | 31.9 | 31.5 | 33.5 | 37.4 | 15.7 | 41.2 | 31.9 | 34 | 10.4 | 31 |
|  | Mg | 22.4 | 22.2 | 22.5 | 28.1 | 10.2 | 35.5 | 22.7 | 21.7 | 22 | 21.5 |
|  | Al | 18.5 | 16.5 | 16.4 | 16.5 | 11.8 | 28.9 | 16.8 | 16.8 | 19.4 | 19.8 |
|  | Cl | 22 | 20.5 | 24 | 24.6 | 24 | 21 | 18.5 | 24.4 | 28 | 27.5 |
|  | Mo | 22 | 24 | 18 | 7 | 31.2 | 28.1 | 22.4 | 20.5 | 20.5 | 21 |
|  | Sb | 1.2 | 1.3 | 0.7 | 1.4 | 5.4 | 1.4 | 1.2 | 1.8 | 1.9 | 1.8 |
|  | Platinum group | 4.5 | 4.5 | 4.5 | 4.5 | 4.5 | 4.5 | 4.5 | 4.5 | 4.5 | 4.5 |
|  | Total 2 | 122.5 | 120.5 | 119.6 | 119.5 | 102.8 | 160.6 | 118 | 123.7 | 106.7 | 127.1 |
| Total 1 + Total 2 |  | 250.2 | 244.2 | 228.9 | 252.7 | 227.2 | 299.6 | 266.4 | 245.3 | 245.4 | 267.7 |
| Generation of precipitate |  | Occurred | Occurred | Occurred | Occurred | Occurred | Occurred | Occurred | Occurred | Occurred | Occurred |
| Increase in cell resistance |  | Occurred | Occurred | Occurred | Occurred | Occurred | Occurred | Occurred | Occurred | Occurred | Occurred |
| Generation of hydrogen |  | Not occurred | Not occurred | Not occurred | Not occurred | Not occurred | Not occurred | Not occurred | Not occurred | Not occurred | Not occurred |

* Values in Table are given in units of mass ppm

Table X and Table XI indicate that, when the total concentration of impurity element ions contributing to generation of precipitate is 220 mass ppm or less, generation of precipitate can be suppressed; in addition, when the total of impurity element ions is 224.5 mass ppm or less, generation of precipitate and generation of hydrogen can be suppressed. In particular, regarding impurity element ions contributing to generation of precipitate, at least one or both of the following can be satisfied: the total concentration of non-active-material element ions belonging to the same period as that of active material element ions is 115 mass ppm or less and the total concentration of element ions belonging to other periods is 111 mass ppm or less; or, regarding impurity element ions contributing to generation of precipitate, one or both of the following can be satisfied: the total concentration of non-active-material element ions belonging to the same period as that of active material element ions is 100 mass ppm or less and the total concentration of element ions belonging to other periods is 100 mass ppm or less.

Regarding the above-described descriptions, the following items are further disclosed.

(Appendix 1)

An electrolyte for a redox flow battery, wherein a total concentration of impurity element ions contributing to generation of precipitate during a battery reaction is 220 mass ppm or less, and when metal element ions contributing to generation of precipitate are classified into iron-group element ions and non-iron-group element ions, at least one of (a) and (b) below is satisfied:

(a) a total concentration of the iron-group element ions is 50 mass ppm or less, and (b) a total concentration of the non-iron-group element ions is 155 mass ppm or less.

(Appendix 2)

An electrolyte for a redox flow battery, wherein a total concentration of impurity element ions contributing to generation of precipitate during a battery reaction is 220 mass ppm or less, and when impurity element ions contributing to generation of precipitate are classified into iron-group element ions and element ions other than the iron-group element ions, at least one of (c) and (d) below is satisfied:

(c) a total concentration of the iron-group element ions is 50 mass ppm or less, and (d) a total concentration of the element ions other than the iron-group element ions in the impurity element ions contributing to generation of precipitate is 180 mass ppm or less.

(Appendix 3)

An electrolyte for a redox flow battery, wherein a total concentration of impurity element ions contributing to generation of precipitate during a battery reaction is 220 mass ppm or less, and when impurity element ions contributing to generation of precipitate are classified into element ions belonging to group 9, element ions belonging to group 10, and element ions other than the element ions belonging to group 9 and the element ions belonging to group 10, at least one of (e) to (g) below is satisfied:

(e) a total concentration of the element ions belonging to group 9 is 2 mass ppm or less, (f) a total concentration of the element ions belonging to group 10 is 5 mass ppm or less, and (g) a total concentration of the element ions other than the element ions belonging to group 9 and the element ions belonging to group 10 is 190 mass ppm or less.

(Appendix 4)

An electrolyte for a redox flow battery, wherein a total concentration of impurity element ions contributing to generation of precipitate during a battery reaction is 220 mass ppm or less, and when impurity element ions contributing to generation of precipitate are classified into non-active-material element ions belonging to the same period as that of active material element ions and element ions belonging to other periods, at least one of (h) and (i) below is satisfied:

(h) a total concentration of the non-active-material element ions belonging to the same period as that of active material element ions is 115 mass ppm or less, and (i) a total concentration of the element ions belonging to other periods is 111 mass ppm or less.

(Appendix 5)

In addition, the electrolyte for a redox flow battery according to any one of (Appendix 1) to (Appendix 4) above, wherein a total concentration of platinum-group element ions is 4.5 mass ppm or less.

INDUSTRIAL APPLICABILITY

An electrolyte for a redox flow battery according to the present invention can be suitably used as an electrolyte of a redox flow battery, which is a secondary battery. A redox flow battery according to the present invention can be suitably used as a battery for load leveling or for voltage sag and power failure prevention.

REFERENCE SIGNS LIST 1 redox flow battery (RF battery)
100 battery cell
101 membrane
102 positive electrode cell
103 negative electrode cell
104 positive electrode
105 negative electrode
106 positive electrode tank
107 negative electrode tank
108 to 111 ducts
112, 113 pumps

The invention claimed is:

1. An electrolyte for a redox flow battery, comprising vanadium ions as an active material,
    wherein a total concentration of impurity element ions contributing to generation of precipitate during a battery reaction is greater than 0 mass ppm and is 220 mass ppm or less, the impurity element ions include metal element ions and a total concentration of the metal element ions is 195 mass ppm or less, and
    wherein the impurity element ions contributing to generation of precipitate satisfy at least one of ($\beta$) to ($\gamma$) below in terms of concentration:
        ($\beta$) a concentration of molybdenum ions is greater than 0 mass ppm and 20 mass ppm or less, and
        ($\gamma$) a concentration of antimony ions is greater than 0 mass ppm and 1 mass ppm or less.

2. The electrolyte for a redox flow battery according to claim 1, wherein the metal element ions include heavy metal element ions and a total concentration of the heavy metal element ions is 85 mass ppm or less.

3. The electrolyte for a redox flow battery according to claim 1, wherein the metal element ions include light metal element ions and a total concentration of the light metal element ions is 120 mass ppm or less.

4. The electrolyte for a redox flow battery according to claim 1,
    wherein the metal element ions include heavy metal element ions and light metal element ions,
    a total concentration of the heavy metal element ions is 85 mass ppm or less, and
    a total concentration of the light metal element ions is 120 mass ppm or less.

5. The electrolyte for a redox flow battery according to claim 1, wherein the impurity element ions include non-metal element ions, wherein the non-metal element ions satisfy at least one of (15) and (16) below in terms of concentration:
    (15) a concentration of chloride ions is 20 mass ppm or less, and
    (16) a concentration of arsenic ions is 1 mass ppm or less.

6. The electrolyte for a redox flow battery according to claim 1, wherein a concentration of the vanadium ions is 1 mol/L or more and 3 mol/L or less, a concentration of free sulfuric acid is 1 mol/L or more and 4 mol/L or less, a concentration of phosphoric acid is $1.0 \times 10^{-4}$ mol/L or more and $7.1 \times 10^{-1}$ mol/L or less, a concentration of ammonium is 20 mass ppm or less, and a concentration of silicon is 40 mass ppm or less.

7. A redox flow battery comprising the electrolyte for a redox flow battery according to claim 1.

* * * * *